J. T. DICKSON.
POP VALVE.
APPLICATION FILED NOV. 14, 1917.

1,305,964.

Patented June 3, 1919.

Inventor
James T. Dickson
by James T. Bachelor
his Attorney

UNITED STATES PATENT OFFICE.

JAMES T. DICKSON, OF LOS ANGELES, CALIFORNIA, ASSIGNOR TO F. C. KINGSTON, OF LOS ANGELES, CALIFORNIA.

POP-VALVE.

1,305,964.   Specification of Letters Patent.   Patented June 3, 1919.

Application filed November 14, 1917. Serial No. 201,976.

*To all whom it may concern:*

Be it known that I, JAMES T. DICKSON, a citizen of the United States, residing at Los Angeles, in the county of Los Angeles, State of California, have invented certain new and useful Improvements in Pop-Valves, of which the following is a specification.

This invention relates to pop valves; and it is an object of this invention to provide a simple pop valve structure particularly adapted to small pump or pressure installations (although not limited to such) and capable of closing tightly and holding fluid pressure (and particularly air pressure) without leakage until a pre-determined pressure is reached.

There are various other objects of this invention which will appear from the following detailed specification; but I may here particularly mention another feature of my pop valve, which is that it makes a distinct blow-off noise which calls attention to the fact that it is open.

Figure 1:
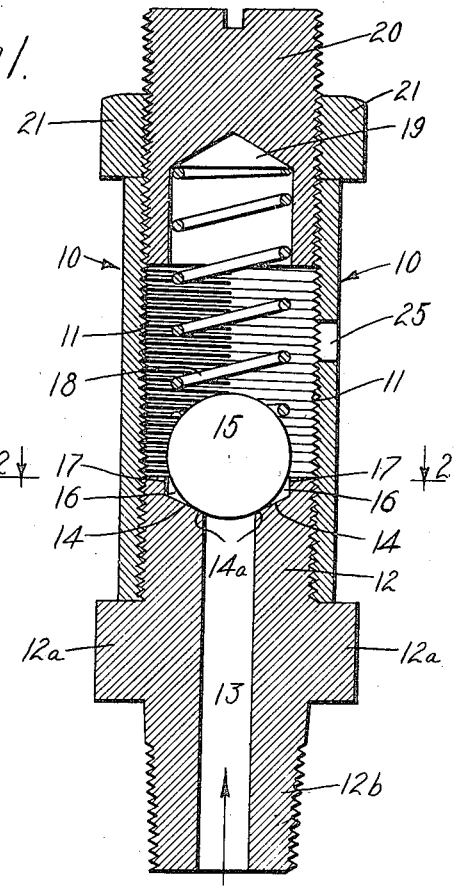
Figure 2:
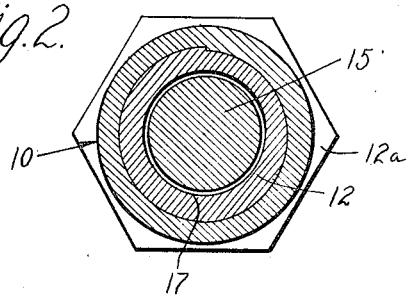

I attain these objects by an extremely simple structure such as is shown in preferred detail in the accompanying drawings and explained in the following specification. In the drawings Figure 1 represents an enlarged central longitudinal section of a pop-valve; and Fig. 2 is a cross section on line 2—2 of Fig. 1.

The numeral 10 designates a suitable shell, which may be of any desired size. I have said that my pop valve is particularly adapted to small apparatus; but it will be understood that it is not limited to small devices, but can be made of any suitable size. In a typical small pop valve the shell 10 is made of a piece of pipe or tubing interiorly threaded as shown at 11. At one end (usually the lower end) a seat plug 12 is screw-threaded into the shell 10 and this seat plug may be provided with a part 12ª for wrench engagement and may also be provided with a screw-threaded end part 12ᵇ for connection with a pressure pipe. Seat plug 12 has a longitudinal passage 13 through it; and at the inner end of this passage I provide a conical seat surface 14 surrounding the end of passage 13. This conical seat surface is machined at such an angle that the valve 15 (which is preferably a ball) seats upon the surface 14 immediately around the passage 13. In preferred practice I make the construction such that the ball actually seats at 14ª on a narrow annular surface immediately around the edge of passage 13. The ball normally stands in a cup 16 whose bottom is formed by a cylindrical wall 17; which cylindrical wall the surface of the ball nearly, but does not quite, touch. In other words, the lower part of the ball nearly fills the cup 16; but the cup preferably does not extend up past the center of the ball. The preferred practical relation of the ball and cup is as shown in the drawings.

The ball 15 forms a most practical and simple form of valve; but it is not necessary to my invention that a ball be used, as any other suitable form of valve may be used instead. And any other suitable formation of the cup may be used, which will coöperate with the valve in the manner herein stated.

The ball is held down on its seat by a spring 18 whose upper end seats in a socket 19 in plug 20 which is screw-threaded into the upper end of shell 10 and is adjustable therein to adjust the spring pressure on the ball 15; a lock nut 21 being used to hold the plug 20 in any desired position.

The fluid pressure enters the port 13 and presses upwardly upon the ball 15 over an area represented approximately by the cross sectional area of passage 13. The ball 15 remains seated until the fluid pressure rises to a point sufficient to overcome the downward pressure of spring 18. The ball then rises off its seat; and immediately it rises off its seat, the fluid pressure from passage 13 passes into the cup 16 and the effective pressure area upon the ball 15 is thereby greatly increased. The fact that the ball fits the cup fairly closely causes the pressure to be somewhat retained in the cup; the passage of the fluid pressure from the cup upwardly around the ball is somewhat choked off at the restricted space inside the upper edge of the ball 17. Consequently, the ball, when it has been once raised off its seat, immediately and almost instantaneously moves farther upwardly in order to allow escape of the pressure fluid into the inclosure of shell 10. The final escape of the pressure fluid from the shell 10 is through a port 25 which is smaller than the passage 13. When the interior of shell 10 has filled with the fluid under pressure, then the restriction at the port 25 causes that pressure to be more or less held in the interior of the shell and causes a back pressure to be built up on the ball 15, tending to help the spring 18 seat the ball. Immediately this occurs, the ball 15 moves downwardly at considerable speed and seats again in the position shown in the drawings. If the fluid pressure is still high enough to raise the ball, the ball immediately moves upwardly again and the operation is repeated. Thus, the ball continuously vibrates up and down as long as the pressure in the passage 13 remains above a certain predetermined point; but as soon as the pressure has fallen to or below that predetermined point, then the ball, upon next reaching its seat 14$^a$, will remain seated. The ball vibrates at a high speed. It moves upwardly very quickly because during this upward movement the effective pressure area upon the ball is being increased. Having reached its upper position, the shell 10 quickly fills with fluid under pressure and the upward and downward fluid pressures upon the ball are then so nearly equalized that the ball is forced back quickly and with some substantial force onto its seat at 14$^a$ by the action of spring 18. Each time the ball is seated it is forced onto its seat with a considerable pressure; so that when it is finally seated, it makes a tight joint. Furthermore, the constant hammering of the ball upon its seat, and the intermittent releases of pressure, cause a very distinctive and very loud noise which call attention to the fact that the pressure is blowing off.

The valve is particularly successful in holding pressure without leakage, particularly in holding air pressure. Most valves require a moisture film to make a tight seat; this valve does not but holds dry air pressure indefinitely. It is easily adjusted and has operated on from ten to two hundred pounds pressure; and can be set to blow off accurately at a given pressure.

I do not limit myself to the particular details herein shown and described, reserving such changes as may be made by those skilled in the art. For instance, as I have hereinbefore stated, I am not limited to the use of a ball valve. Neither am I limited to the particular configuration shown and described for the cup 16. This cup may be of any cross-sectional shape that will attain the ends desired, viz.—the seating of the valve comparatively close around the passage 13 and the choking of pressure escape around the valve when the valve has once been raised.

Having described a preferred form of my invention, I claim:

1. A pop valve comprising a casing having an outlet port and an inlet port for a medium under pressure, said inlet port being of greater area than said outlet port, and a normally seated valve for the inlet port, whereby accumulated and reduced pressure is successively attained in the casing at the outlet side of the valve to cause vibration of the latter to and from its seat when the pressure of said medium rises above a predetermined point.

2. A pop valve comprising a casing having an outlet port and an inlet port for a medium under pressure, said inlet port being of greater area than said outlet port and being surrounded by a seat and a wall forming a cup, and a normally seated valve for the inlet port slightly spaced from said wall of the cup when seated on said seat, whereby accumulated and reduced pressure is successively attained in the casing at the outlet side of the valve to cause vibrations of the latter to and from its seat when the pressure of said medium rises above a predetermined point.

3. A pop valve comprising a shell having an outlet port therethrough, a plug secured in one end of the shell and having a passage therethrough of greater area than said outlet port for the inlet of a medium under pressure, the inner end of said plug being provided with a valve seat around said passage, a wall extending from said seat of an internal diameter larger than that of said inlet passage, said seat and wall forming a cup, a valve loosely arranged within said shell of a configuration and size whereby a slight space is left between the same and the wall of the cup when the valve is seated on said seat, a closure for the other end of the shell, and yieldable means to normally seat said valve, whereby accumulated and reduced pressure is successively attained in the shell at the outlet side of the valve to cause vibration of the latter to and from its seat when the pressure of said medium rises above a predetermined point.

4. A pop valve comprising a shell having an outlet port therethrough, a plug secured in one end of the shell and having a passage therethrough of greater area than said outlet port for the inlet of a medium under pressure, the inner end of said plug being provided with a conical valve seat around said passage, a cylindrical wall extending from said seat of an internal diameter larger than that of said inlet passage, said seat and wall forming a cup, a ball valve loosely arranged within said shell of a size whereby a slight uniform space is left between the same and the cylindrical wall of the cup when the valve is seated on said seat, a closure for the outer end of the shell, and yieldable means to normally seat said valve, whereby accumulated and reduced pressure is successively attained in the shell at the outlet side of the valve to cause vibration of the latter to and from its seat when the pressure of said medium rises above a predetermined point.

5. A pop valve comprising a shell having an outlet port therethrough, a plug secured in one end of the shell and having a passage therethrough of greater area than said outlet port for the inlet of a medium under pressure, the inner end of said plug being provided with a valve seat around said passage, a wall extending from said seat of an internal diameter larger than that of said inlet passage, said seat and wall forming a cup, a valve loosely arranged within said shell of a configuration and size whereby a slight space is left between the same and the wall of the cup when the valve is seated on said seat, a second plug adjustably secured in the other end of the shell, and a spring having its opposite ends respectively engaging the valve and the second named plug to normally maintain said valve seated with a pressure determined by the adjustment of said second plug, whereby accumulated and reduced pressure is successively attained in the shell at the outlet side of the valve to cause vibration of the latter to and from its seat when the pressure of said medium rises above a predetermined point.

6. A pop valve comprising a tubular shell having an outlet port therethrough, a plug secured in one end of the shell and having a passage therethrough of greater area than said outlet port for the inlet of a medium under pressure, the inner end of said plug being provided with a conical valve seat around said passage, a cylindrical wall extending from said seat of an internal diameter larger than that of said inlet passage, said seat and wall forming a cup, a ball valve loosely arranged within said shell of a size whereby a slight uniform space is left between the same and the cylindrical wall of the cup when the valve is seated on said seat, a second plug secured in and closing the other end of the shell and adjustable axially of the latter, a spring having its opposite ends respectively engaging the valve and the second plug to normally maintain said valve seated with a pressure determined by the adjustment of said second plug, and means to retain said second plug in adjusted position, whereby accumulated and reduced pressure is successively attained in the shell at the outlet side of the valve to cause vibration of the latter to and from its seat when the pressure of said medium rises above a predetermined point.

In witness that I claim the foregoing I have hereunto subscribed my name.

JAMES T. DICKSON.